(12) United States Patent
Humphrey et al.

(10) Patent No.: US 12,013,180 B2
(45) Date of Patent: Jun. 18, 2024

(54) FEED APPARATUS FOR A SLURRY

(71) Applicant: CDE Global Limited, Cookstown (GB)

(72) Inventors: Alexander Humphrey, Cookstown (GB); Jordan McCooe, Cookstown (GB)

(73) Assignee: CDE Global Limited, Cookstown (GB)

( * ) Notice: Subject to any disclaimer, the term of this patent is extended or adjusted under 35 U.S.C. 154(b) by 453 days.

(21) Appl. No.: 17/432,716

(22) PCT Filed: Feb. 20, 2020

(86) PCT No.: PCT/EP2020/054461
§ 371 (c)(1),
(2) Date: Aug. 20, 2021

(87) PCT Pub. No.: WO2020/169721
PCT Pub. Date: Aug. 27, 2020

(65) Prior Publication Data
US 2022/0163259 A1    May 26, 2022

(30) Foreign Application Priority Data
Feb. 22, 2019   (GB) ..................................... 1902421

(51) Int. Cl.
*F26B 25/04*      (2006.01)
*B65G 17/12*      (2006.01)
(Continued)

(52) U.S. Cl.
CPC ............ *F26B 25/04* (2013.01); *B65G 17/126* (2013.01); *B65G 47/1442* (2013.01);
(Continued)

(58) Field of Classification Search
None
See application file for complete search history.

(56) References Cited

U.S. PATENT DOCUMENTS

| | | | |
|---|---|---|---|
| 4,534,461 A | 8/1985 | Silverthorn et al. | |
| 5,341,962 A | 8/1994 | Way et al. | |
| (Continued) | | | |

FOREIGN PATENT DOCUMENTS

| | | |
|---|---|---|
| CN | 101604459 | 12/2009 |
| CN | 102310049 | 1/2012 |
| (Continued) | | |

OTHER PUBLICATIONS

International Search Report of corresponding PCT Application No. PCT/EP2020/054461, dated Jun. 9, 2020.
(Continued)

*Primary Examiner* — Kavel Singh
(74) *Attorney, Agent, or Firm* — Gardner, Linn, Burkhart & Ondersma LLP (57) ABSTRACT

An apparatus is provided for feeding slurry to a recycling or slurry treatment process at an elevated location. The apparatus includes a reception hopper for receiving the slurry from a transport vehicle, and a bucket elevator for conveying the slurry from a loading zone, in communication with the reception hopper, to a discharge zone at an elevated location. The reception hopper includes a trough having parallel side walls and a bottom wall. The loading zone of the bucket elevator communicates with a first end of the trough, the trough including a movable wall extending perpendicular to the side walls of the reception hopper and being movable towards the first end of the trough to urge slurry towards the loading zone of the bucket elevator.

18 Claims, 8 Drawing Sheets

(51) Int. Cl.
*B65G 47/14* (2006.01)
*B65G 47/18* (2006.01)
*B65G 65/06* (2006.01)
*F26B 5/00* (2006.01)
*F26B 9/08* (2006.01)

(52) U.S. Cl.
CPC ............ *B65G 47/18* (2013.01); *B65G 65/06* (2013.01); *F26B 5/00* (2013.01); *F26B 9/082* (2013.01); *F26B 2200/18* (2013.01)

(56) References Cited

U.S. PATENT DOCUMENTS

| | | | | | |
|---|---|---|---|---|---|
| 5,526,922 | A | * | 6/1996 | Clark | B65G 17/126 |
| | | | | | 198/708 |
| 8,147,689 | B1 | * | 4/2012 | Cogar | B01D 33/327 |
| | | | | | 210/241 |
| 8,701,868 | B2 | * | 4/2014 | Hall | A01C 15/006 |
| | | | | | 198/581 |

FOREIGN PATENT DOCUMENTS

| | | | | |
|---|---|---|---|---|
| CN | 202795194 | | 3/2013 | |
| CN | 109205180 | | 1/2019 | |
| EP | 1790616 | | 5/2007 | |
| ES | 2931374 | A2 * | 12/2022 | ........... B65G 41/008 |
| WO | 03041477 | | 5/2003 | |

OTHER PUBLICATIONS

UK Search Report of corresponding Application No. GB1902421.5, dated Jul. 26, 2019.

* cited by examiner

FEED APPARATUS FOR A SLURRY

CROSS REFERENCE TO RELATED APPLICATIONS

The present application is a § 371 national stage of International Application PCT/EP2020/054461, filed Feb. 20, 2020, which claims priority benefit to U.K. Pat. Application Ser. No. 1902421.5, filed Feb. 22, 2019, both of which are hereby incorporated herein by reference in their entireties.

FIELD OF THE INVENTION

This invention relates to a feed apparatus for a slurry, and in particular to a feed apparatus that can be used to feed slurry from a hydro-excavation or NDD process to a dewatering screen or other recycling or slurry treatment process at an elevated location.

BACKGROUND OF THE INVENTION

Hydro-excavation is a process for performing ground works wherein high-pressure water jets are used to cut and dig earth and a vacuum system is used to suck up the resulting slurry into a storage tank mounted on a vehicle (referred to herein after as a "hydrovac tanker") for subsequent disposal. The slurry held in the storage tank of such hydrovac tankers must be emptied at a disposal or recycling site.

The slurry collected during such hydro-evacuation process typically comprises 50% free water and 50% solids. Typically such slurry is discharged from the storage tank of the hydrovac tanker into a reception hopper at a disposal or recycling site by hydraulically raising the tank while opening a rear door in the tank, such that the slurry is discharged into the reception hopper under gravity. This typically requires the reception hopper to be positioned at a relatively low level.

However, slurry recycling systems upon which the slurry is to be treated, such as dewatering screens, are typically mounted at a higher level than the reception hopper, for example so that the slurry can be delivered onto the recycling system under gravity and so that separated water and fine material passing through a dewatering screen or other treatment process can collect under gravity in a sump therebeneath. Therefore, it is often required to convey the slurry from the reception hopper to an elevated position via a suitable conveying device.

Due to the high water content of the slurry and the often abrasive nature of the solids entrained therein bucket elevators are considered particularly suitable for this purpose, wherein a series of spaced apart buckets are mounted on an endless belt, chains or like endless elements extending around upper and lower sprockets, pulleys or other guide means driven such that the buckets, filled with the slurry, travel upwardly between the upper and lower sprockets or pulleys between a loading zone adjacent the lower sprocket or pulley and within the reception hopper and a discharge zone adjacent the upper sprocket or pulley, the buckets being inverted in the discharge zone as they pass over the upper sprocket or pulley to discharge material therefrom before returning to the loading zone adjacent the lower sprocket or pulley to be refilled.

However, problems can arise in feeding the slurry to the loading zone of the bucket conveyor. The wet nature of the slurry prevents the use of traditional belt conveyors for transferring the material to the loading zone of the bucket conveyor. Furthermore, solid material in the slurry tends to settle out of suspension in the reception hopper and fall to the bottom of the hopper, away from the loading zone of the bucket elevator. One prior art solution is to use a screw conveyor to feed material from the reception hopper to the loading zone of the bucket elevator, such as disclosed in U.S. Pat. No. 4,534,461. However, the often abrasive nature of hydro-excavation waste leads to rapid wear of such screw conveyors.

SUMMARY OF THE INVENTION

According to aspects of the present invention there is provided an apparatus for feeding slurry to a recycling or slurry treatment process at an elevated location, the apparatus comprising a reception hopper for receiving slurry from a transport vehicle and a bucket elevator for conveying the slurry from a loading zone in communication with the reception hopper to a discharge zone at an elevated location, wherein the reception hopper comprises a trough having parallel side walls and a bottom wall, the loading zone of the bucket elevator communicating with a first end of the trough, the trough including a movable wall movable towards the first end of the trough to urge slurry towards the loading zone of the bucket elevator. Optionally, the movable wall extends perpendicular to the side walls of the trough.

Optionally, an actuator is provided for moving the movable wall towards and away from the first end of the trough. In one embodiment the actuator may comprise a multi-stage ram.

A seal assembly may be provided around a peripheral edge of the movable wall engaging the side walls and bottom wall of the trough to form a seal thereagainst. The seal assembly may be replaceable.

Elongate guides may be provided along the side walls of the trough for guiding movement of the movable wall. The elongate guides may comprise respective guide rails on either side of the trough extending parallel to the side walls of the trough, the movable wall including carriages engaging the guide rails. The guide rails may be provided at or adjacent upper edges of the side walls of the trough. In one embodiment the guide rails may be provided on lower sides of respective lips extending inwardly from an upper edge of each side wall of the trough.

Optionally, a support frame is provided on a rear side of the movable wall adapted to maintain the movable wall perpendicular to side walls of the trough. Where provided, the carriages engaging the guides may be provided on an upper side of the support frame, extending perpendicular to the movable wall and parallel to the side walls of the trough.

The bucket elevator may comprise a plurality of spaced apart buckets mounted on one or more endless elements extending around upper and lower guides or guide devices driven such that the buckets travel upwardly between the upper and lower guide devices between the loading zone, wherein the buckets can receive material held in the reception hopper, and a discharge zone adjacent the upper guide device, the buckets being inverted in the discharge zone as they pass over the upper guide device to discharge material therefrom before returning to the loading zone adjacent the lower guide device. The one or more endless elements may comprise an endless belt upon which the buckets are mounted, the upper and lower guide devices comprising upper and lower rollers or pulleys upon which the endless belt is mounted. The loading zone of the bucket elevator may be located within the reception hopper at or adjacent the first end of the trough.

Each bucket of the bucket elevator may comprise a base, a back wall, lateral walls, and a front wall.

The apparatus may further comprise a dewatering device adjacent a discharge zone of the bucket elevator for receiving slurry therefrom. The dewatering device may comprise a dewatering screen having an apertured deck upon which slurry is deposited from the discharge zone of the bucket elevator, a vibration generator or generating device for vibrating the apertured deck whereby undersize material and water passes through the apertured deck and is collected in a sump beneath the apertured deck while oversize material falls from a discharge end of the deck.

These and other objects, advantages and features of the invention will become apparent upon review of the following specification in conjunction with the drawings.

BRIEF DESCRIPTION OF THE DRAWINGS

An apparatus for feeding slurry to a recycling or slurry treatment process at an elevated location in accordance with an embodiment of the present invention will now be described, by way of example only, with reference to the accompanying drawings, in which.

DETAILED DESCRIPTION OF THE PREFERRED EMBODIMENTS

As illustrated in the drawings, a slurry treatment apparatus for treating hydro-evacuation waste, in particular for dewatering the waste, incorporating a feed apparatus in accordance with an embodiment of the present invention comprises a reception hopper 2 adapted to receive slurry discharged from a hydrovac tanker, a dewatering screen 4 mounted on a support frame 6 above a sump 8 and an inclined bucket elevator 10 for conveying slurry from the reception hopper 2 to the dewatering screen 4.

The reception hopper 2 comprises an elongate trough having parallel side walls 12,14 and a bottom wall 15. A movable wall 16 is mounted within the reception hopper 2 adapted to be advanced along the trough towards a loading zone 18 of the bucket elevator 10 at one end of the reception hopper 2 for urging material within the reception hopper 2 towards and into the loading zone 18 of the bucket elevator 10. The bottom wall 15 of the reception hopper 2 may slope downwardly towards the loading zone 18 of the bucket elevator 10.

A resilient seal assembly 20 is mounted on a peripheral edge of the movable wall 16 forming a liquid tight seal between the movable wall 16 and the side walls 12,14 and bottom wall 15 of the reception hopper 2. The seal assembly 20 may be replaceable when worn.

A support frame 22 is provided on a rear side of the movable wall 16. Guide rails 24,26 are provided along lower sides of respective lips 28,30, the lips 28,30 extending inwardly from upper edges of the side walls 12,14 of the reception hopper 2. The guide rails 24,26 extend parallel to the side walls 12,14 of the reception hopper 2. Carriages 32,34 are provided on upper sides of the support frame 22 of the movable wall extending perpendicular to the movable wall 16 and parallel to the side walls 12,14 of the reception hopper, the carriages 32,34 engaging the guide rails 24,26 to guide movement of the movable wall 16 along the elongate trough defined by the reception hopper 2 and to maintain the movable wall 16 perpendicular to the side walls 12,14 of the reception hopper 2. The engagement of the carriages 32,34 with the guide rails 24,26 also maintains the seal assembly 20 of the movable wall 16 in engagement with the side and bottom walls 12,14,15 of the reception hopper 2. The carriages 32,34 may be adapted to run on the guide rails 24,26 without requiring lubrication.

A multi-stage ram 36 or other suitable actuator is provided for displacing the movable wall 16 along the reception hopper 2, preferably acting between the movable wall and a rear wall of the reception hopper.

The bucket elevator 10 comprises an endless belt 38 supported upon upper and lower guide rollers (not shown) within an inclined conveyor support frame 40, a plurality of spaced apart buckets 42 being mounted on the endless belt 38 such that the buckets travel upwardly on an upper run of the belt 38 between the loading zone 18 within an end region of the reception hopper 2, wherein the buckets 42 can receive material held in the reception hopper, and a discharge zone 44 located at an elevated location above the dewatering screen 4, the buckets 42 being inverted in the discharge zone 44 as they pass over the upper guide roller to discharge material therefrom onto a deck 46 of the dewatering screen 4 before returning to the loading zone 18 adjacent the lower guide roller on a lower run of the belt 38 to be refilled. Each bucket 42 comprises a base, a back wall, lateral walls, and a front wall as is conventional in the art.

The loading zone 18 of the bucket elevator 10 is defined by an end region of the reception hopper 2, opposite the movable wall 16. The side walls 12,14 of the reception hopper may taper inwardly towards the loading zone 18, the bottom wall 15 of the reception hopper defining a curved sump region 48 through which the buckets 42 pass in close proximity to the bottom wall 18 to ensure that all of the material in the reception hopper 2 is transferred to the dewatering screen 4 via the bucket elevator 10.

Figure 1:
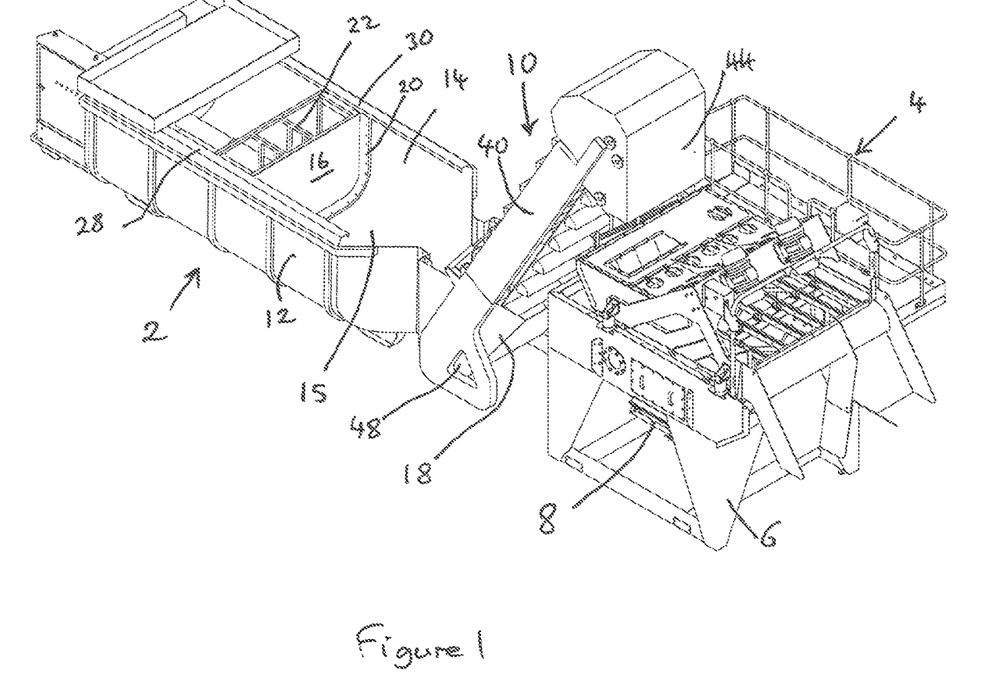
FIG. 1 is a perspective view of a slurry treatment apparatus for treating hydro-evacuation waste incorporating a feed apparatus in accordance with an embodiment of the present invention.
Figure 2:
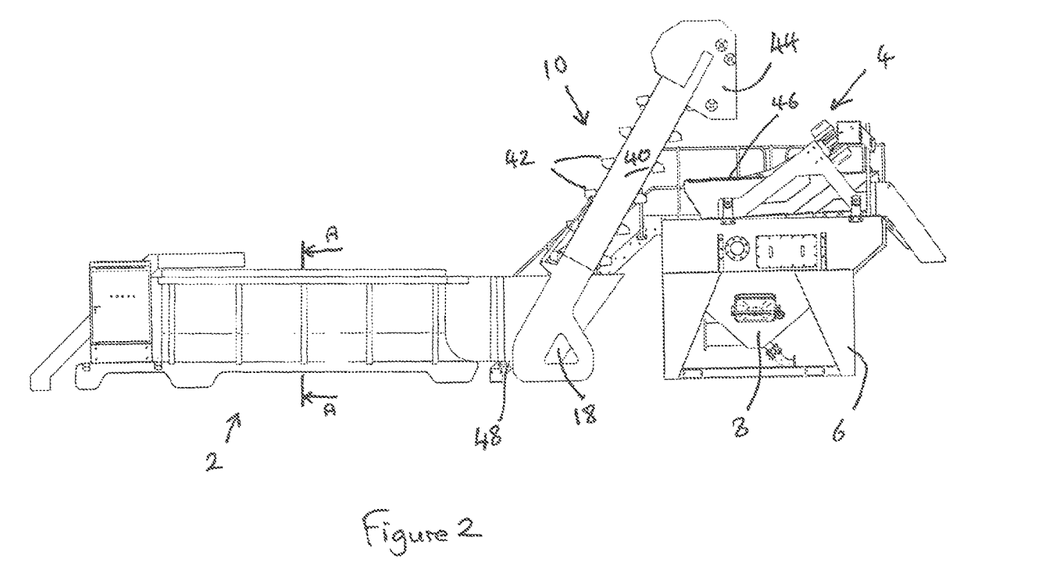
FIG. 2 is a side view of the apparatus of FIG. 1.
Figure 3:
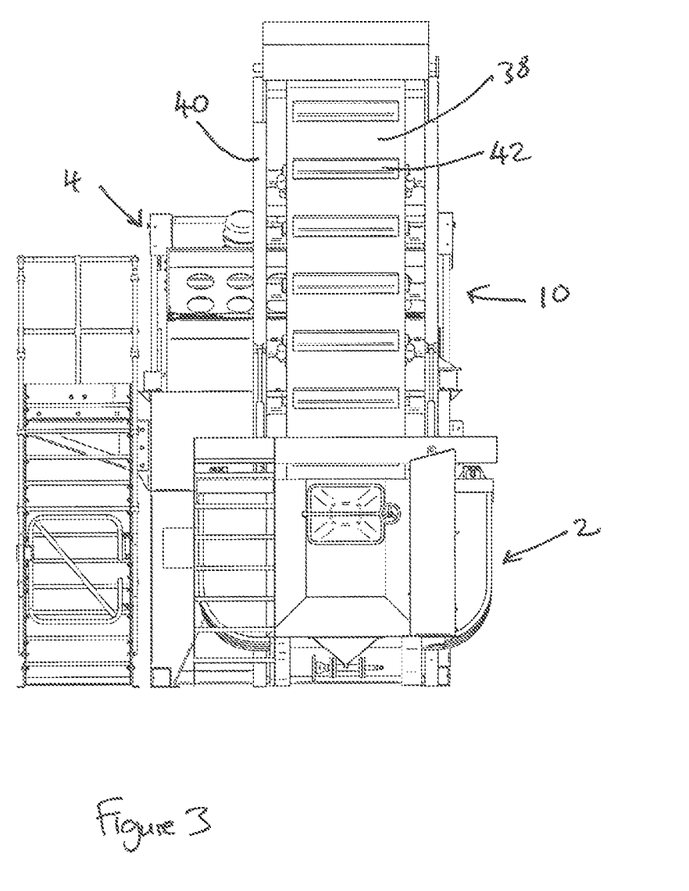
FIG. 3 is an end view of the apparatus of FIG. 1.
Figure 4:
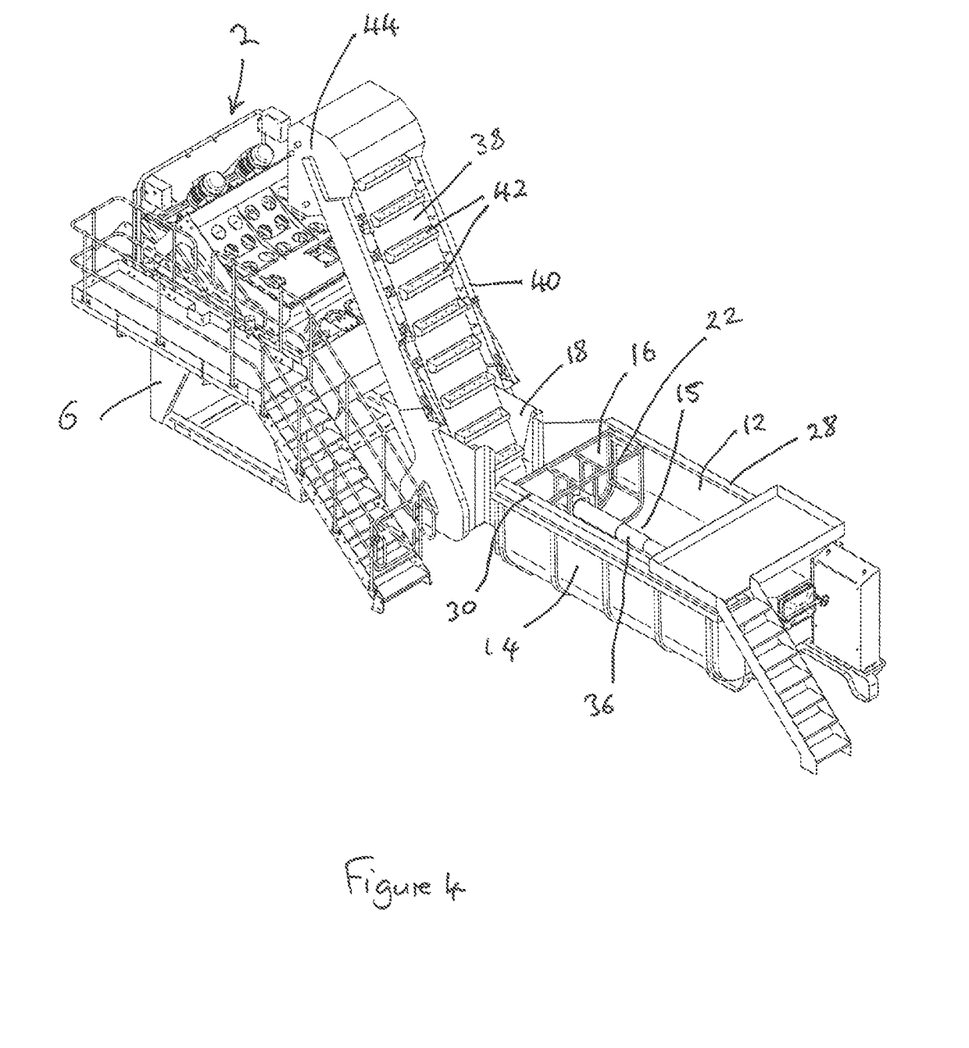
FIG. 4 is a further perspective view of the apparatus of FIG. 1.
Figure 5:
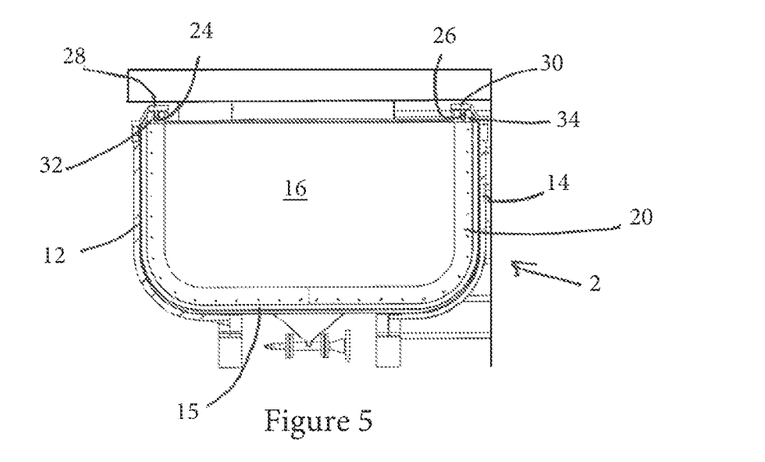
FIG. 5 is a sectional view on line A-A of FIG. 2.
Figure 6:
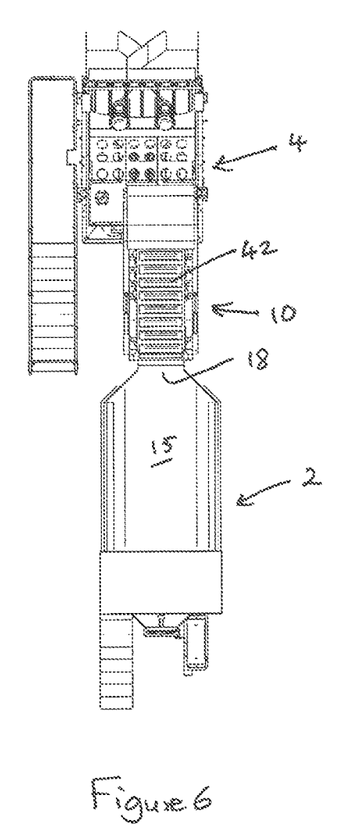
FIGS. 6 to 8 are plan views of the apparatus of FIG. 1 showing the movable wall of the reception hopper in different positions.
Figure 7:
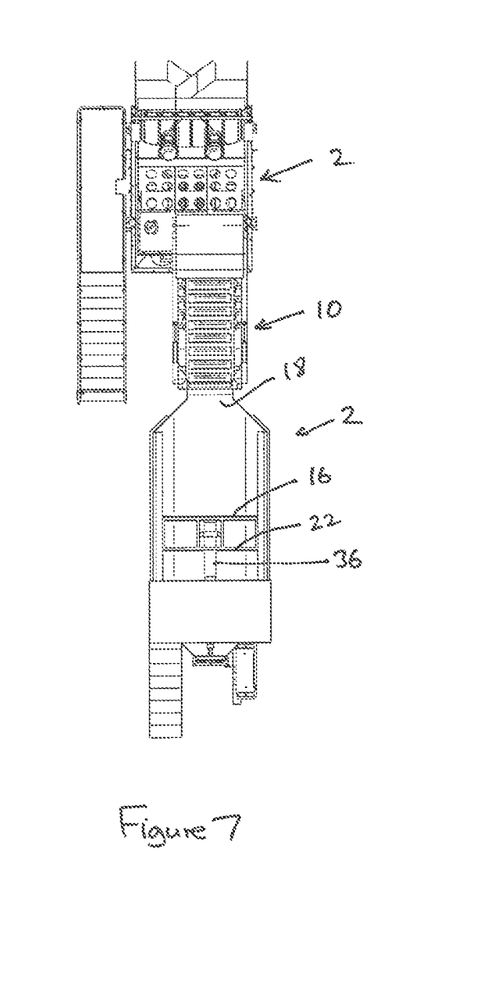
Figure 8:
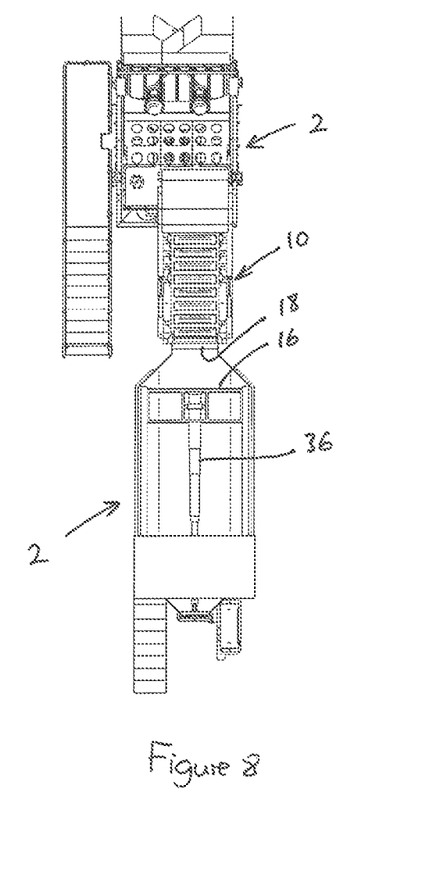

In use, with the movable wall 16 in a fully retracted position, as illustrated in FIG. 6, slurry, such as hydro-evacuation waste from a hydrovac tanker, is discharged into the reception hopper 2, flowing into the loading zone 18 of the bucket elevator 10, which is operated to convey the slurry onto the deck 46 of the dewatering screen 4. As the level of the slurry in the reception hopper 2 falls, a point is reached, which may be detected by a level sensor, at which the ram 36 is extended to begin to advance the movable wall 16 towards the loading zone 18 of the bucket elevator 10, as illustrated in FIG. 7, while the bucket elevator 10 continues to convey the slurry to the deck 46 of the dewatering screen 4. The movable wall 16 pushes any solid material collected in the bottom of the reception hopper 2 towards the loading zone 18 of the bucket elevator. The movable wall 16 continues to be advanced until it reaches it fully advanced position within the reception hopper 2, as shown in FIG. 8.

Once the reception hopper has been emptied of slurry by the bucket elevator 10 the bucket elevator 10 is stopped and the ram 36 is operated to return the movable wall 16 to its full retracted position within the reception hopper 2 before a further batch of slurry is discharged into the reception hopper 2 and the process repeated.

While the feed apparatus has been described in the above embodiment in use with a dewatering screen it is envisaged that the feed apparatus in accordance with the present invention may used to convey slurry from a reception hopper to an elevated location in respect of numerous other applications and the apparatus may be modified without departing from the scope of the present invention as defined in the appended claims.

The invention is not limited to the embodiments described herein but can be amended or modified without departing from the scope of the present invention, which is intended to be limited only by the scope of the appended claims as interpreted according to the principles of patent law including the doctrine of equivalents.

The invention claimed is:

1. An apparatus for feeding slurry to a recycling or slurry treatment process at an elevated location, said apparatus comprising:
    a reception hopper for receiving slurry from a transport vehicle, said reception hopper comprising a trough having, parallel side walls, a bottom wall, and a movable wall;
    a bucket elevator for conveying the slurry from a loading zone in communication with said reception hopper to a discharge zone at the elevated location, said loading zone of said bucket elevator communicating with a first end of said trough; and
    a dewatering device adjacent said discharge zone of said bucket elevator for receiving the slurry therefrom;
    wherein said moveable wall is moveable towards said first end of said trough to urge the slurry towards said loading zone of said bucket elevator; and
    wherein said dewatering device comprises a dewatering screen having an apertured deck upon which the slurry is deposited from said discharge zone of said bucket elevator, a vibration generator for vibrating said apertured deck, and a sump beneath said apertured deck, such that, in use, undersize material and water pass through said apertured deck to be collected in said sump while oversize material falls from a discharge end of said deck.

2. The apparatus of claim 1, wherein said moveable wall extends perpendicular to said side walls of said trough.

3. The apparatus of claim 1, wherein an actuator is provided for moving said moveable wall towards and away from said first end of said trough.

4. The apparatus of claim 3, wherein said actuator comprises a multi-stage ram.

5. The apparatus of claim 1, wherein a seal assembly is provided around a peripheral edge of said moveable wall, said seal assembly engaging said side walls and said bottom wall of said trough to form a seal thereagainst.

6. The apparatus of claim 5, wherein said seal assembly is replaceable.

7. The apparatus of claim 1, wherein elongate guides are provided along said side walls of said trough for guiding movement of said moveable wall.

8. The apparatus of claim 7, wherein said elongate guides comprise respective guide rails provided on either side of said trough, said guide rails extending parallel to said side walls of said trough, said moveable wall including carriages engaging said guide rails.

9. The apparatus of claim 8, wherein said guide rails are provided at or adjacent upper edges of said side walls of said trough.

10. The apparatus of claim 9, wherein said guide rails are provided on lower sides of respective lips extending inwardly from an upper edge of each side wall of said trough.

11. The apparatus of claim 9, wherein a support frame is provided on a rear side of said moveable wall, said support frame adapted to maintain said moveable wall perpendicular to side walls of said trough, and wherein said carriages engaging said guide rails are provided on an upper side of said support frame, said guide rails extending perpendicular to said moveable wall and parallel to said side walls of said trough.

12. Then apparatus of claim 1, wherein a support frame is provided on a rear side of said moveable wall, said support frame adapted to maintain said moveable wall perpendicular to side walls of said trough.

13. The apparatus of claim 1, wherein said bucket elevator comprises a plurality of spaced apart buckets mounted on one or more endless elements extending around upper and lower guides driven such that said buckets travel upwardly between said upper and lower guides, from said loading zone where said buckets can receive material held in said reception hopper, to said discharge zone adjacent said upper guide, said buckets being inverted in said discharge zone as said buckets pass over said upper guide to discharge material therefrom before returning to said loading zone adjacent said lower guide.

14. The apparatus of claim 13, wherein one or more endless elements comprises an endless belt upon which said buckets are mounted, said upper and lower guides comprising upper and lower rollers or pulleys upon which said endless belt is mounted.

15. The apparatus of claim 13, wherein said loading zone of said bucket elevator is located within said reception hopper at or adjacent said first end of said trough.

16. The apparatus of claim 1, wherein each bucket of said bucket elevator comprises a base, a back wall, lateral walls, and a front wall.

17. A recycling or slurry treatment apparatus incorporating the slurry feeding apparatus of claim 1.

18. An apparatus for feeding slurry to a recycling or slurry treatment process at an elevated location, said apparatus comprising:
    a reception hopper for receiving slurry from a transport vehicle, said reception hopper comprising a trough having, parallel side walls, a bottom wall, and a movable wall;
    a bucket elevator for conveying the slurry from a loading zone in communication with said reception hopper to a discharge zone at the elevated location, said loading zone of said bucket elevator communicating with a first end of said trough;
    elongate guides disposed along said side walls of said trough and perpendicular to said movable wall, for guiding movement of said moveable wall; and
    a support frame on a rear side of said moveable wall, said support frame adapted to maintain said moveable wall perpendicular to said side walls of said trough;
    wherein said moveable wall is moveable along said elongate guides towards said first end of said trough to urge the slurry towards said loading zone of said bucket elevator.

* * * * *